(12) United States Patent
Liu et al.

(10) Patent No.: US 9,468,334 B2
(45) Date of Patent: Oct. 18, 2016

(54) GRILL PAN AND GRILL HAVING THE SAME

(75) Inventors: Ta Chi Liu, Tainan (TW); Lifeng Xie, Zhangzhou (CN)

(73) Assignee: TSAN KUEN (ZHANGZHOU) ENTERPRISE CO., LTD., Zhangzhou (CN)

( * ) Notice: Subject to any disclaimer, the term of this patent is extended or adjusted under 35 U.S.C. 154(b) by 806 days.

(21) Appl. No.: 12/862,935

(22) Filed: Aug. 25, 2010

(65) Prior Publication Data
US 2011/0048250 A1   Mar. 3, 2011

(30) Foreign Application Priority Data

Aug. 26, 2009   (CN) .................... 2009 2 0308936 U

(51) Int. Cl.
| | | |
|---|---|---|
| A47J 37/06 | (2006.01) | |
| A47J 37/10 | (2006.01) | |
| A47J 37/07 | (2006.01) | |

(52) U.S. Cl.
CPC ........... *A47J 37/067* (2013.01); *A47J 37/0611* (2013.01); *A47J 37/0704* (2013.01); *A47J 37/10* (2013.01)

(58) Field of Classification Search
CPC .. A47J 37/0611; A47J 37/0786; A47J 37/10; A47J 37/0694; A47J 37/0704; A47J 39/00; A47J 27/004; A21B 3/04; H05B 1/0213
USPC ........ 99/372, 375, 380, 400, 422, 425, 426, 99/446, 447, 448; 219/401, 415, 524, 525
See application file for complete search history.

(56) References Cited

U.S. PATENT DOCUMENTS

| | | | | |
|---|---|---|---|---|
| 113,886 | A  * | 4/1871 | Howard | 99/446 |
| D229,532 | S  * | 12/1973 | Colato et al. | D7/409 |
| 5,606,905 | A  * | 3/1997 | Boehm et al. | 99/375 |
| D413,760 | S  * | 9/1999 | Tsai et al. | D7/352 |
| 6,016,741 | A  * | 1/2000 | Tsai et al. | 99/341 |
| 6,269,738 | B1 * | 8/2001 | Huang | A47J 37/0611 99/372 |
| 6,363,839 | B1 * | 4/2002 | Wu | 99/375 |
| 6,484,624 | B1 * | 11/2002 | Wu | 99/339 |
| 6,994,017 | B2 * | 2/2006 | Lerner | 99/376 |
| D611,762 | S  * | 3/2010 | Liu et al. | D7/409 |
| 2005/0204931 | A1* | 9/2005 | Cheng | 99/422 |

* cited by examiner

*Primary Examiner* — Dana Ross
*Assistant Examiner* — Hemant Mathew
(74) *Attorney, Agent, or Firm* — Rabin & Berdo, P.C.

(57) ABSTRACT

A grill pan, more particularly, a pan with ribs of grill and grill having the same, has a cambered plane for cooking with gradually decreasing height structure, wherein at least two abreast arranged are ribs saliently disposed, and the distance between two adjacent ribs is less than or equal to twofold of the breadth of each rib. The ribs prevent food from falling on the cooking plane of pan as it becomes floppy when cooking, so that the elimination of grease and the effect of cooking won't be affected.

16 Claims, 3 Drawing Sheets

GRILL PAN AND GRILL HAVING THE SAME

FIELD OF INVENTION

The present invention relates to a grill pan, more particularly to a pan with ribs and a grill having the same.

BACKGROUND OF THE INVENTION

The existing grill has a flat pan or a pan with horizontal ribs, where food can be laid when it is being cooked, the grill has some disadvantages as follows:

First, the pan is flat, so that any grease is not separated from the food;

Second, the ribs are usually too high or too low. When the ribs are too high the cooking speed is slow, and, when they are too low the grease is no separated from the food;

Third, the separation between the ribs is not practical, consequently, food possibly falls on the cooking plane of pan as it becomes floppy as it cooks, which reduces the effect of eliminating grease of the ribs and the cooking efficiency.

SUMMARY OF THE INVENTION

The object of the present invention is to provide a grill pan and grill having the same which have practical ribs designed to overcome the shortcomings of prior art.

To achieve the objective above, the present invention provides a grill pan, comprising a cambered plane for cooking with a gradually decreasing height structure, wherein at least two abreast arranged ribs saliently disposed, and the distance between two adjacent ribs is less than or equal to twofold of the breadth of each rib.

According to a preferable embodiment, the breadth of each rib is 4.5-6.5 mm.

According to a preferable embodiment, the distance between two adjacent ribs is 9-11 mm.

According to a preferable embodiment, said ribs are concave and gradually curled at the ends, and comprise wave crests and troughs with space between one another, wherein the distance between two adjacent wave crests is 40-60 mm.

According to a preferable embodiment, the height of said troughs of said ribs is greater than the thickness of said grill.

According to a preferable embodiment, the height of said wave crests is greater than or equal to 1.5 times of the height of said troughs.

According to a preferable embodiment, the height of said wave crests is 4-6 mm, and the height of said troughs is 1.5-3 mm.

According to a preferable embodiment, an arc transitional section is disposed between said wave crests and adjacent troughs.

According to a preferable embodiment, wherein the radius of said arc transitional section is 3-5 mm.

A grill, comprises a pan, wherein said pan comprising a cambered plane for cooking with gradually decreasing height structure, wherein at least two abreast arranged ribs salient disposed, and the distance between two adjacent ribs less than or equal to twofold of the breadth of each rib.

According to a preferable embodiment, the breadth of each rib is 4.5-6.5 mm.

According to a preferable embodiment, the distance between two adjacent ribs is 9-11 mm.

According to a preferable embodiment, said ribs are concave and gradually curled at the ends, and comprise wave crests and troughs with space one another, wherein the distance between two adjacent wave crests is 40-60 mm.

According to a preferable embodiment, the height of said troughs of said ribs is greater than the thickness of said grill.

According to a preferable embodiment, the height of said wave crests is greater than or equal to 1.5 times of the height of said troughs.

According to a preferable embodiment, the height of said wave crests is 4-6 mm, and the height of said troughs is 1.5-3 mm.

According to a preferable embodiment, an arc transitional section is disposed between said wave crests and adjacent troughs.

According to a preferable embodiment, the radius of said arc transitional section is 3-5 mm.

From the description above, we can know that, compared with prior art, the present invention has some advantages as follows:

First, the structure of ribs is concave and gradually curled at the ends, which makes food on the pan fall uneasily, so, the effect of frying and toasting is better;

Second, the pan has a cambered plane for frying and toasting with gradually decreasing height structure, which promotes the elimination of grease from the food and makes food more healthy;

Third, the breadth and space of ribs are practically designed, which makes the degree of charring of food after cooking even;

Fourth, by virtue of a practical rib height, the grease is separated from the food more efficiently, and the processing time is reduced. Thus, the food cooked is healthier;

Fifth, the distance between two adjacent wave crests is 40-60 mm, which is very practical because two adjacent wave crests approximately hold a piece of hamburger meat.

Sixth, the arc transitional section between wave crests and adjacent troughs, prevents food from falling better, and the user can move the cooking food more conveniently;

Seventh, the breadth of each rib is 4.5-6.5 mm, and the distance between two adjacent ribs is 9-11 mm, which prevents food from falling on the cooking plane of pan as it becomes floppy when being cooked, so that the grease elimination and the cooking of the food isn't affected.

DESCRIPTION OF THE PREFERRED EMBODIMENTS

Figure 1:
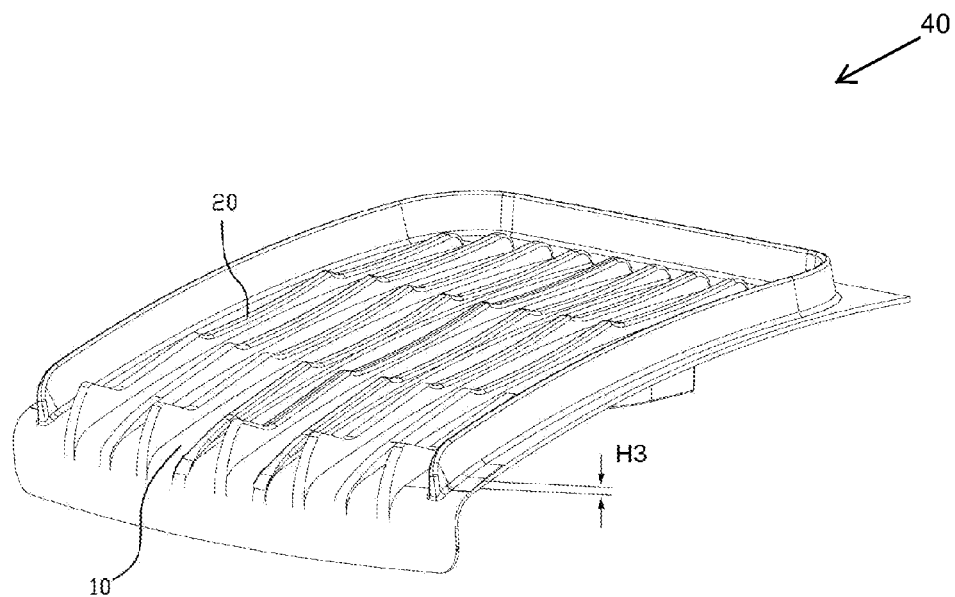
FIG. 1 is a perspective view of an embodiment of the present invention.
Figure 3:
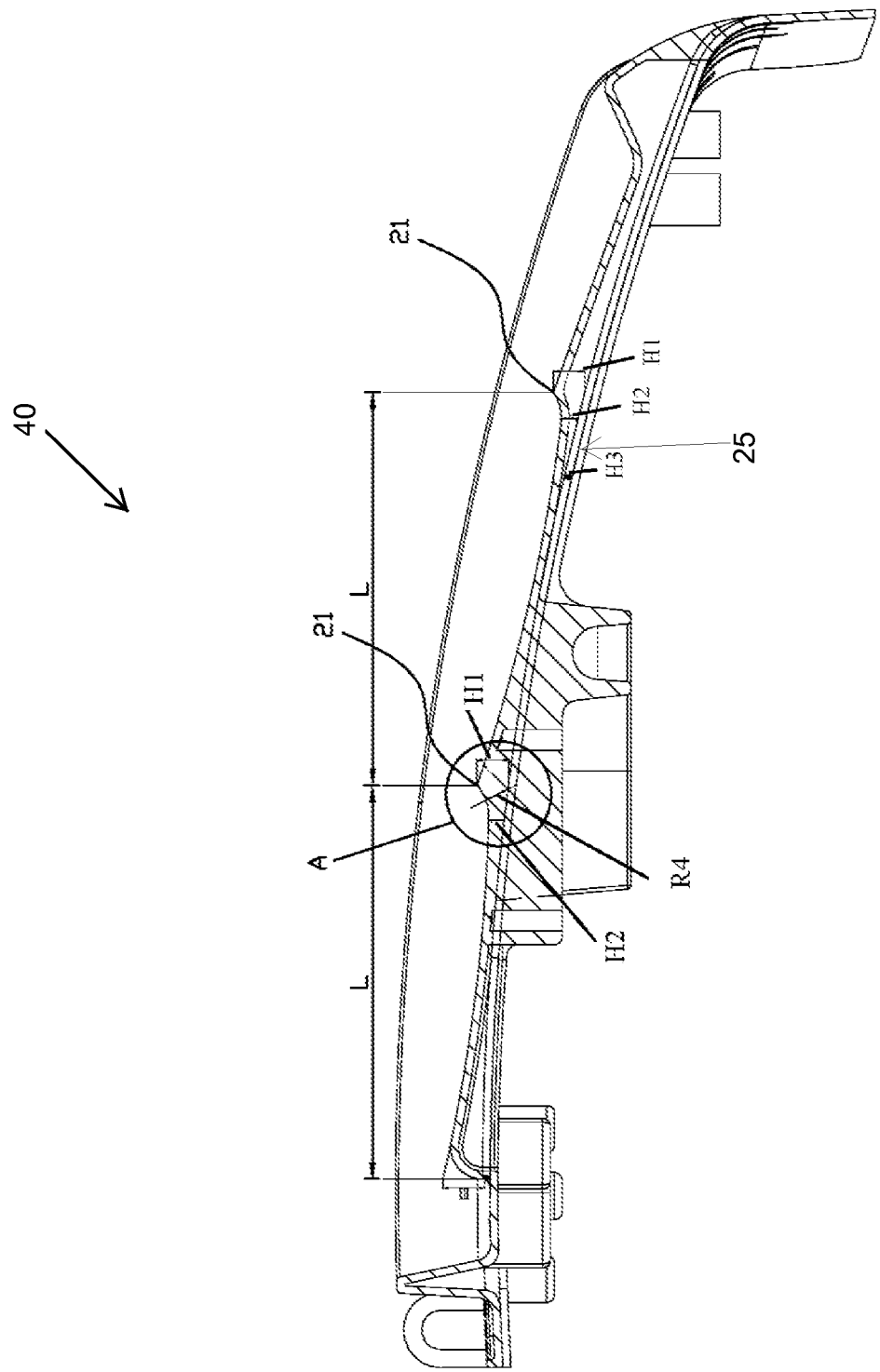
FIG. 3 is a sectional view of a rib along a direction in which the rib is disposed in accordance with an embodiment of the present invention.

Referring to FIG. 1 and FIG. 3, a grill 40 in the present invention, comprises at least a pan, wherein several ribs 20 are saliently disposed on the cooking plane of the pan, wherein ribs 20 are concave and gradually curled at the ends. Referring to FIG. 3, the distance L between two adjacent wave crests 21 is 40-60 mm, thus, two adjacent wave crests approximately hold a piece of hamburger meat, which divides the whole pan into several relatively independent hamburger meat cooking areas. Thus, several pieces of hamburger meat can be cooked at one time.

Referring to FIG. 1 and FIG. 3, cambered plane for cooking has gradually decreasing height structure, and the concave and gradually curled at the ends ribs 20 thereupon have gradually decreasing structure in whole, by virtue of it, when food is being cooked, grease first falls into the cooking plane 10, then falls off the plane 10. The food cooked are healthier and more delicious because of the elimination of grease.

Figure 2:
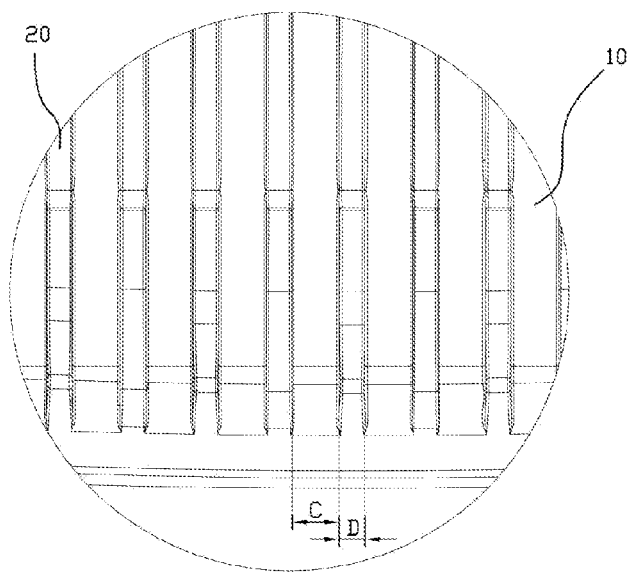
FIG. 2 is a partial top view of an embodiment of the present invention.

Referring to FIG. 2, breadth D of each rib is 4.5-6.5 mm, distance C between two adjacent ribs is 9-11 mm, and make sure distance C between two adjacent ribs is less than or equal to twofold of breadth D of each rib. The design of the ribs above ensures enough contact area between the ribs and food, and prevent food from falling on the plane between two ribs as it becomes floppy while cooking.

Figure 4:
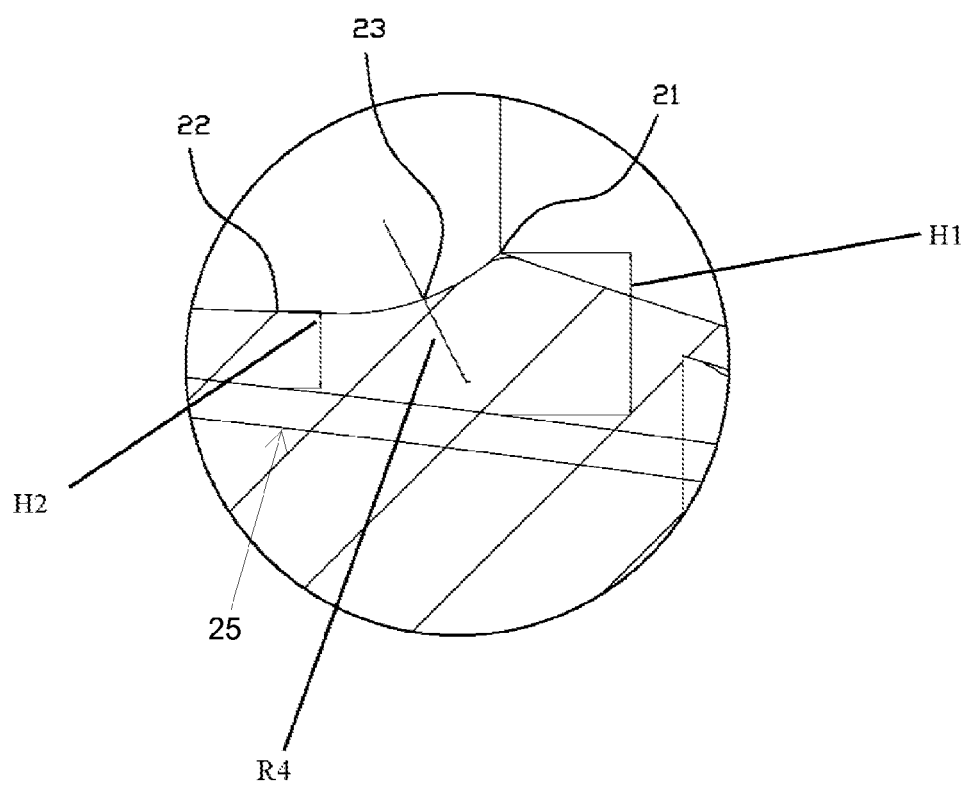
FIG. 4 is an enlargement view of A in FIG. 3.

Referring to FIG. 1, FIG. 3 and FIG. 4, the height H2 of troughs 22 of ribs 20 is greater than the thickness of the pan H3, wherein the thickness H3 of the pan is the distance between the plane 10 and the bottom surface 25 of the pan. The height H1 of wave crests 21 is greater than or equal to 1.5 times of the height H2 of troughs 22, wherein the height H1 of wave crests 21 is 4-6 mm, the height H2 of troughs 22 is 1.5-3 mm. The height of ribs is very practical, not too low to affect the elimination of grease; no too high to increase cooking time. The proportion of wave crests to troughs ensures the stability when food is laid on ribs.

Referring to FIG. 4, an arc transitional section 23 is disposed between the wave crests 21 and troughs 22, the radius R4 of which is 3-5 mm. By adoption of the arc transitional section 23, food is prevented from falling and users can remove the food which is done cooking to their dishes more conveniently.

The described embodiments are to be considered in all respects only as illustrative and not restrictive. All changes within the meaning and range of equivalency of the claims are to be embraced with their scope.

What is claimed is:

1. A grill pan comprising:
a cambered cooking plane having a gradually decreasing height; and
a plurality of parallel ribs projecting from the cambered plane, each of the plurality of ribs defining a breadth,
said ribs being concave and gradually curled at an end thereof, each of the ribs comprising, along a direction in which the rib is disposed,
a plurality of wave crests disposed along the direction, the wave crests dividing the cambered plane into cooking areas, and
a plurality of troughs disposed along the direction, each of the plurality of troughs joining at least one wave crest,
wherein the entire cambered cooking plane has an upward curve along the direction.

2. The grill pan according to claim 1, wherein the breadth of the ribs is from 4.5 to 6.5 mm.

3. The grill pan according to claim 1, wherein the distance between two adjacent parallel ribs is from 9 to 11 mm.

4. The grill pan according to claim 1, wherein each of the troughs has a height that is greater than a thickness of said grill pan.

5. The grill pan according to claim 1, wherein each of the troughs has a trough height, and each of said wave crests has a crest height that is greater than or equal to 1.5 times of the trough height.

6. The grill pan according to claim 5, wherein the crest height is from 4 to 6 mm, and wherein the trough height is from 1.5 to 3 mm.

7. The grill pan according to claim 1, wherein an arc transitional section is disposed between one of the wave crests and an adjacent trough.

8. The grill pan according to claim 7, wherein each of said arc transitional sections has a radius from 3 to 5 mm.

9. A grill comprising:
a pan comprising a cambered cooking plane having a gradually decreasing height; and
a plurality of parallel ribs projecting from the cambered plane, each of the plurality of ribs having a breadth,
said ribs being concave and gradually curled at an end thereof, each of the ribs comprising, along a direction in which the rib is disposed,
a plurality of wave crests disposed along the direction, the wave crests dividing the cambered plane into cooking areas, and
a plurality of troughs disposed along the direction, each of the plurality of troughs joining at least one wave crest,
wherein the entire cambered cooking plane has an upward curve along the direction.

10. The grill according to claim 9, wherein the breadth of the ribs is from 4.5 to 6.5 mm.

11. The grill according to claim 9, wherein the distance between two adjacent parallel ribs is from 9 to 11 mm.

12. The grill according to claim 9, wherein each of said troughs has a height greater than a thickness of said pan.

13. The grill according to claim 9, wherein each of the troughs has a trough height, and each of said wave crests has a crest height that is greater than or equal to 1.5 times of the trough height.

14. The grill according to claim 13, wherein the crest height is from 4 to 6 mm, and wherein the trough height is from 1.5 to 3 mm.

15. The grill according to claim 9, wherein an arc transitional section is disposed between one of the wave crests and an adjacent trough.

16. The grill according to claim 15, wherein each of said arc transitional sections has a radius from 3 to 5 mm.

* * * * *